(12) United States Patent
Polzin

(10) Patent No.: US 6,681,168 B2
(45) Date of Patent: Jan. 20, 2004

(54) TRACTION CONTROL DEVICE AND A METHOD FOR CONTROLLING THE SLIP OF A WHEEL

(75) Inventor: Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 10/020,489

(22) Filed: Oct. 29, 2001

(65) Prior Publication Data

US 2002/0099489 A1 Jul. 25, 2002

(30) Foreign Application Priority Data

Oct. 28, 2000 (DE) .......................................... 100 53 608

(51) Int. Cl.[7] ................................................ B60T 7/12
(52) U.S. Cl. ............................ 701/83; 701/70; 701/73; 701/78; 701/79; 701/80; 701/82; 180/197; 303/146; 303/148; 303/149; 303/139; 303/156; 303/192
(58) Field of Search ............................ 701/83, 82, 70, 701/73, 74, 75, 78, 79, 80; 180/197; 303/146, 148, 139, 149, 156, 192

(56) References Cited

U.S. PATENT DOCUMENTS

| 5,322,356 | A | * | 6/1994 | Kolbe et al. ................. 303/139 |
| 5,944,394 | A | * | 8/1999 | Friederichs et al. ......... 303/148 |
| 6,000,765 | A | * | 12/1999 | Hinz et al. ................... 303/148 |
| 6,044,319 | A | * | 3/2000 | Rosendahl et al. ............ 701/71 |
| 6,318,820 | B1 | * | 11/2001 | Usukura ....................... 303/149 |
| 6,325,469 | B1 | * | 12/2001 | Carson et al. ............... 303/140 |

FOREIGN PATENT DOCUMENTS

| DE | 34 23 063 | 1/1986 |
| DE | 196 15 294 | 10/1997 |

* cited by examiner

Primary Examiner—William A. Cuchlinski, Jr.
Assistant Examiner—Brian J Broadhead
(74) Attorney, Agent, or Firm—Kenyon & Kenyon

(57) ABSTRACT

A traction control device for a vehicle that has at least one axle, to which two driven wheels are assigned, the traction control device, when one of the driven wheels of the axle shows a tendency to spin, regulating the kinematic behavior of the wheel tending to spin by building up a first wheel brake pressure such that the wheel tending to spin of the axle remains within a permissible slip range. In order to reduce disturbance torques caused by the first wheel brake pressure for a wheel that is not tending to spin of the axle, a second wheel brake pressure is built up, which is adjustable independently of the first wheel brake pressure. Also described is a method for controlling the slip of at least one driven wheel of an axle of a vehicle.

8 Claims, 3 Drawing Sheets

TRACTION CONTROL DEVICE AND A METHOD FOR CONTROLLING THE SLIP OF A WHEEL

FIELD OF THE INVENTION

The present invention relates to a traction control device for a vehicle that has at least one axle, which has two driven wheels assigned to it, the traction control device, in response to a tendency for one of the driven wheels of the axle to spin, regulating the kinematic behavior of the wheel tending to spin by building up a first wheel brake pressure such that the axle wheel tending to spin remains in a permissible slip range. In addition, the present invention relates to a method for controlling the slip of at least one driven wheel of an axle of a vehicle, the method including the following steps: a) detecting a tendency to spin of one driven wheel of the axle, and b) regulating the kinematic behavior of the axle wheel tending to spin by building up a first wheel brake pressure such that the axle wheel tending to spin remains within a permissible slip range.

BACKGROUND INFORMATION

It is known that in traction control devices, when the regulation begins, to overcome the system-specific dead times, a long, first sustained build-up is carried out, which is termed a filling pulse.

From German Published Patent Application No. 34 23 063, by way of example, a traction control device for vehicles is known in which a wheel is braked if that wheel demonstrates a tendency to spin. In this context, to achieve a rapid response of the brakes when a tendency to spin is detected, the brake is applied already in the preliminary stages of the tendency to spin by initiating a small brake pressure. In this context, the supplying of the small brake pressure is triggered as a function of the change in the throttle valve position, as a function of the vehicle speed, or as a function of the slip thresholds which lie beneath the response thresholds for the actual anti-slip regulation. The supplying of the small brake pressure is accomplished by a filling pulse of constant time duration. This means that when there is a necessity to supply the small brake pressure, the latter is fed into the corresponding wheel brake cylinder for a fixedly predetermined time. As a result of the small brake pressure which is supplied before the actual brake operation, the reaction time is shortened that elapses from determining the tendency to spin until the beginning of the braking. Because the filling pulse in accordance with German Published Patent Application No. 3423063 has a fixedly predetermined time duration for all wheels of the vehicle, tolerances that can be different for the individual wheels, for example, are not taken into account.

To assure that the wheel brakes of all the wheels are in the same state before the actually necessary, foreseeable braking operation, it is already known from German Published Patent Application No. 196 15 294 to individually adjust, for each individual wheel of the vehicle, the time duration during which an activation of the actuators assigned to the respective wheel is undertaken before a foreseeable driver-independent braking operation, and during which, for example, in a hydraulic braking system, a small braking pressure is supplied to the respective wheel brake cylinder and therefore a braking force is applied. In this manner, the mechanical play that is different for the individual wheel brakes is compensated for, the mechanical play coming about, for example, as a result of the mechanical tolerances of the components used. The result of this is that when a braking operation is necessary, all of the wheel brakes demonstrate the identical regulation behavior.

It is also known that a relatively long filling pulse can make uphill driving easier (for example, 15% $\mu$-split slope). At the end of a relatively long filling pulse of this type, the wheel brake pressure can be roughly 5 to 10 bar. Based on this pressure, the locking ratio can be rapidly increased through a further pressure build-up, so that the vehicle can be prevented from rolling backwards. On a level surface, a smaller braking pressure is sufficient due to the absence of a downward force. In general, the filling pulse, especially in single-sided regulation, for example, when starting up on $\mu$-split, results in a worsening of the regulation comfort, because the wheel brake torque that is built up on one side by the filling pulse is perceptible as a disturbing torque. To reduce this disturbing torque, the filling pulse in general is carried out in a shorter time. Usually, a compromise is struck between the adjustment for traction during uphill driving and the adjustment that has a small disturbing torque.

The disturbing torque caused by the filling pulse and especially affecting the vertical axis of the vehicle has an direct effect, for example, on the steering in response to a regulation at the front axle, and in response to a regulation on the rear axle, the result is a vehicle that pulls to one side.

SUMMARY OF THE INVENTION

As a result of the fact that in the traction control device according to the present invention it is provided that, for reducing disturbance torques caused by the first wheel brake pressure for an axle wheel that is not tending to spin, a second wheel brake pressure is built up which is adjustable independently of the first wheel brake pressure, the disadvantageous effects of the disturbing torque can at least be significantly reduced.

The same applies to the method according to the present invention, which also includes the step: c) building up a second wheel brake pressure, that is adjustable independently of the first wheel brake pressure, for an axle wheel that does not tend to spin, to reduce a disturbing torque caused by the first wheel brake pressure.

In the traction control device according to the present invention, it is provided that a first filling pulse contributes to building up the first wheel brake pressure, and that a second filling pulse contributes to building up the second wheel brake pressure. As a result of a second filling pulse which is carried out synchronously at the unregulated drive wheel, which due to higher coefficient of friction $\mu$ is also termed the high wheel, the disturbing torque is significantly reduced.

In the traction control device according to the present invention, it is advantageously also provided that the length of the second filling pulse is selected such that the vehicle is not limited in its forward motion. Relevant in this connection is the appropriate wheel brake pressure reduction undertaken after the end of the second filling pulse.

The traction control device according to the present invention is also advantageously designed so that the length of the second filling pulse is selected such that, when there is a road incline, a rolling back motion of the vehicle is reduced or prevented. The first slip bulge typically lasts approximately 1 to 1.5 seconds. When there is a road incline, the rolling back motion of the vehicle begins during this time. If in this time period, a wheel brake pressure is present at the unregulated high wheel, this wheel brake pressure does not impair the start-up process, but it does reduce the rollback tendency.

In this connection, the traction control device according to the present invention advantageously provides that the second wheel brake pressure is slowly reduced until the vehicle is clearly moving in the forward direction. To reduce the wheel brake pressure, it is advantageous to use an appropriate reduction pulse, for example, a leakage pulse, using which the second wheel brake pressure at the unregulated high wheel can be slowly reduced. As the threshold value for a clear forward motion, it is possible to use, for example, a vehicle speed of more than 2.75 km/h. At this time point, the second wheel brake pressure can function to prevent instability in the high wheel, an instability of this type being able to be triggered, for example, by a differential change effect. Nevertheless, if instability should arise at the high wheel, the second wheel brake pressure can be quickly built up on the basis of the residual pressure still present.

In connection with the traction control device according to the present invention, it can also be provided that the first wheel brake pressure and/or the second wheel brake pressure are reduced for a predetermined time segment only until the brake pads assigned to the respective wheels have been applied to the corresponding brake disks and/or brake drums. In this manner, in the event of a subsequent instability, air play is avoided and a more rapid pressure build-up is made possible.

In one specific embodiment of the traction control device according to the present invention, it is provided that the first filling pulse has a length such that, at the time point of the end of the first filling pulse, the first wheel brake pressure lies within the range of 7.5 to 12.5 bar, if the axle is a front axle. If the axle is a rear axle, it is advantageously provided that the first filling pulse have a length such that, at the time point of the end of the first filling pulse, the first wheel brake pressure lies within the range of 15 to 20 bar. The different pressure levels for the front and rear axles derive from different average regulating pressures. The average regulating pressure in a front wheel brake can be, for example, 35 bar, whereas in a rear wheel brake it can amount to, for example, 70 bar.

In the traction control device according to the present invention, the second filling pulse advantageously has a length such that the second wheel brake pressure is approximately 50% to 75% of the first wheel brake pressure at the time point of the end of the first filling pulse. A dimensioning of the second filling pulse of this kind is viewed as particularly advantageous for reducing the disturbance torques.

In the method according to the present invention, it is advantageously provided that at step b) a first filling pulse contributes to building up the first wheel brake pressure, and that at step c) a second filling pulse contributes to building up the second wheel brake pressure. As a result of a second filling pulse, which is carried out synchronously at the unregulated drive wheel, which due to the higher coefficient of friction $\mu$ is also termed the high wheel, the disturbing torque, as was mentioned, can be significantly reduced.

The method according to the present invention furthermore advantageously provides that at step c) the length of the second filling pulse is selected such that a forward motion of the vehicle is not limited.

In addition, the length of the second filling pulse in the context of method step c) can be selected such that, when there is a road incline, a rolling back motion of the vehicle is reduced or prevented. In the related art, a rollback motion caused by a road incline usually begins during the first slip bulge, which can last typically approximately 1 to 1.5 seconds. If in this time period a wheel brake pressure is present at the unregulated high wheel, this wheel brake pressure does not impair the start-up process, but it does reduce the rollback tendency.

In the method according to the present invention, it is also preferred that the second wheel brake pressure be reduced slowly until the vehicle is clearly moving forward.

Furthermore, the method according to the present invention can provide that the first wheel brake pressure and/or the second wheel brake pressure can be reduced at least for a predetermined time segment only until the brake pads assigned to the respective wheels have been applied to the corresponding brake disks and/or brake drums.

In one preferred embodiment of the method according to the present invention, it is provided that at step b) the first filling pulse has a length such that, at the time point of the end of the first filling pulse, the first wheel brake pressure lies within the range of 7.5 to 12.5 bar, if the axle is a front axle. In the event that the axle is a rear axle, it is advantageously provided that at step b) the first filling pulse has a length such that, at the time point of the end of the first filling pulse, the first wheel brake pressure lies within the range of 15 to 20 bar.

In method step c), the length of the second filling pulse can be selected such that the second wheel brake pressure amounts to approximately 50% to 75% of the first wheel brake pressure at the time point of the end of the first filling pulse.

DETAILED DESCRIPTION

Figure 1:
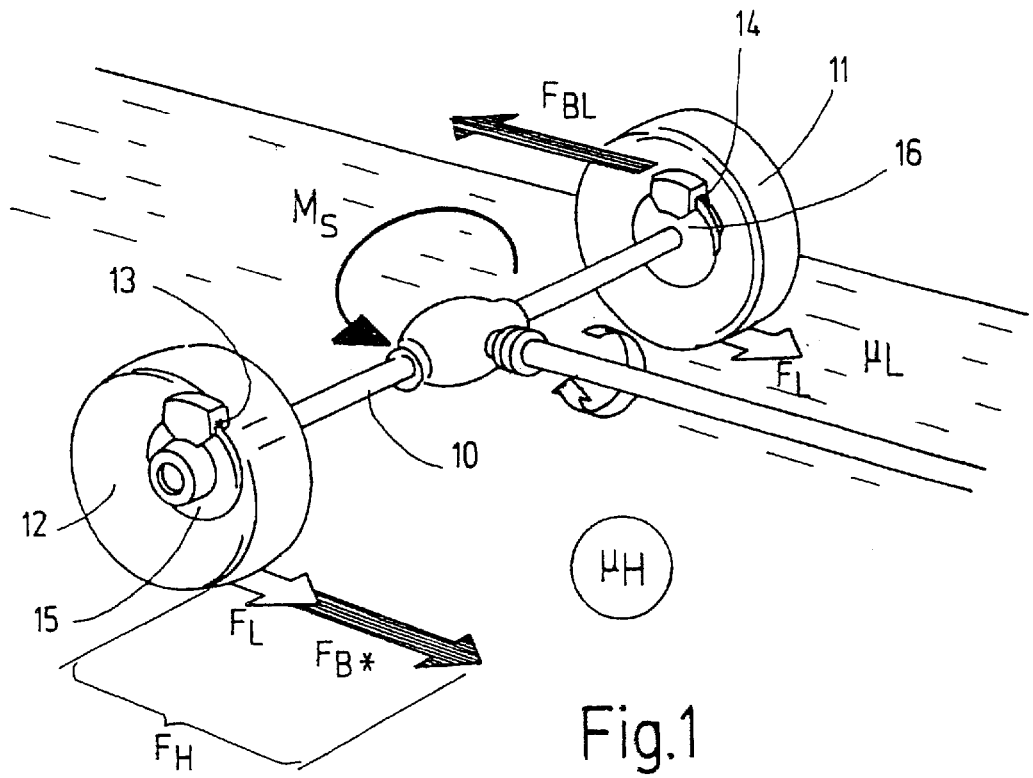
FIG. 1 shows a schematic representation of the forces and torques generated by a conventional traction control device.

FIG. 1 depicts a schematic representation of the forces and torques generated by a conventional traction control device. According to FIG. 1, two driven wheels 11, 12 are assigned to a rear axle 10 of a vehicle. Wheel 11 is situated on a road segment which has a low coefficient of friction $\mu_L$, wheel 11 therefore also being termed the low wheel. Due to lower coefficient of friction $\mu_L$ of the road, wheel 11 has a tendency to spin. In contrast, wheel 12 is situated on a road segment which has a high coefficient of friction $\mu_H$. Wheel 12 is therefore termed the high wheel. In addition to force components $F_L$ acting on low wheel 11, as a result of the traction control device according to the related art, a force component $F_{BL}$ is exerted, and specifically by a braking device 14, 16. Acting upon high wheel 12 is a force $F_H$, which is composed of a force component $F_L$ and a force component $F_B{}^*$. In accordance with the representation in FIG. 4, the following relationships therefore apply:

$$F_B{}^* = F_{BL}$$

$$F_H = F_B{}^* + F_L.$$

As a result of these forces, a disturbing torque $M_S$ is generated that acts about the vehicle vertical axis, as is indicated in FIG. 1 by the curving arrow.

Figure 2:
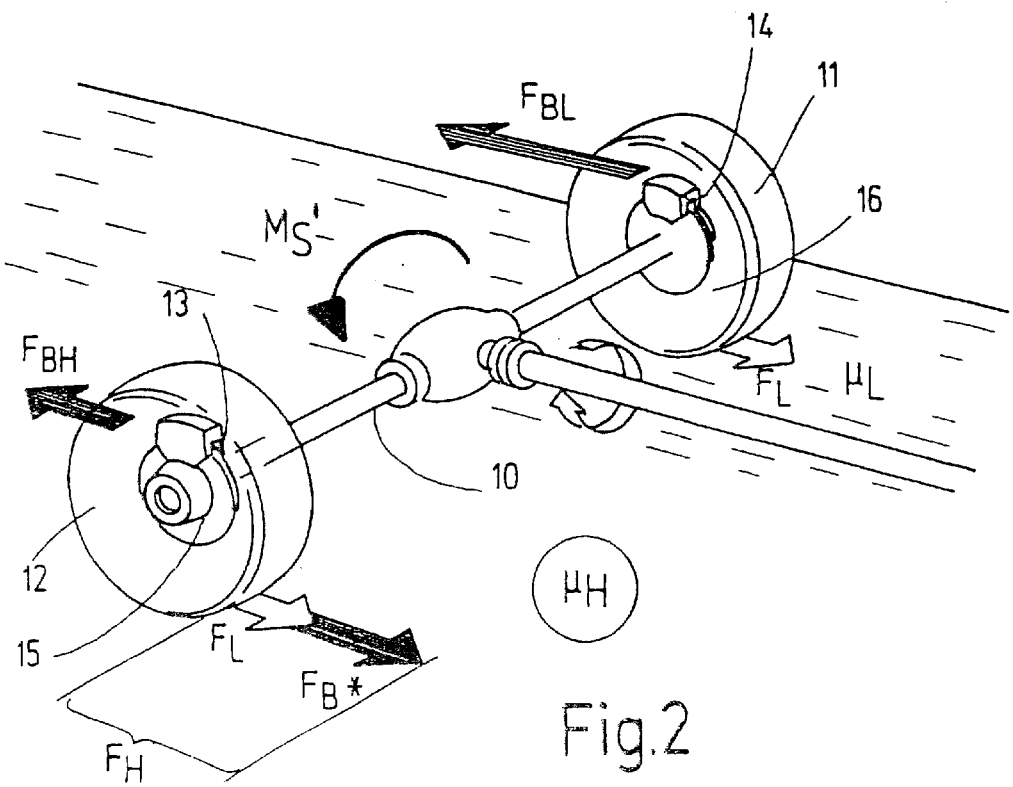
FIG. 2 shows a schematic representation of the forces and torques generated by an embodiment of the traction control device according to the present invention.

FIG. 2 depicts a schematic representation of the forces and torques generated by an embodiment of the traction control device according to the present invention. The depiction of FIG. 2 corresponds essentially to the depiction of FIG. 1. However, the traction control device according to the present invention builds up a second wheel brake pressure in order to reduce disturbance torques $M_S$, caused by the first wheel brake pressure, for wheel 12, which is not tending to spin, of axle 10, the second wheel brake pressure being adjustable independently of the first wheel brake pressure. This second wheel brake pressure generates a force component $F_{BH}$, which also acts upon high wheel 12. According to the representation of FIG. 2, the following relationships therefore apply:

$$F_B{}^* = F_{BL} - F_{BH}$$

$$F_H = F_B{}^* + F_L.$$

As can be seen from the force components depicted in FIG. 2, disturbing torque $M_S$, which is generated by force component $F_{BL}$ about the vehicle vertical axis, is at least partially compensated for by force component $F_{BH}$, so that the overall result is only a reduced disturbing torque $M_S'$.

Figure 3:
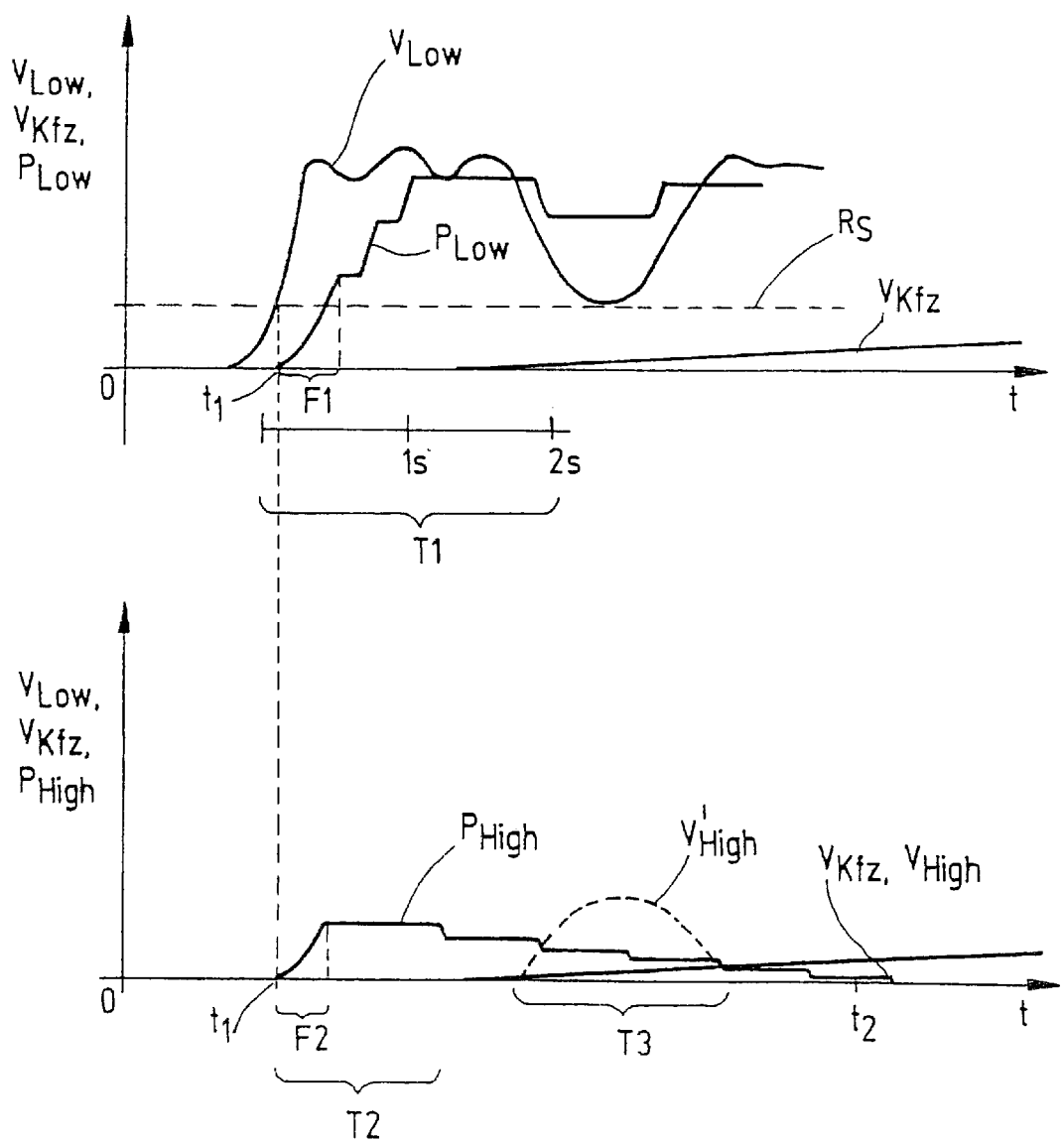
FIG. 3 presents a contrast of the curve shapes, achieved by the present invention, of the speeds and of the wheel brake pressures for a wheel having a tendency to spin and for a wheel not having a tendency to spin.

FIG. 3 depicts a contrast of the curve shapes of the speeds and of the wheel brake pressures for a wheel having a tendency to spin and a wheel not having a tendency to spin. The upper graph of FIG. 3 relates to the low wheel, i.e., the wheel for which lower coefficient of friction $\mu$ obtains. In this graph, $v_{Low}$ designates the curve of the wheel speed of the low wheel, $p_{Low}$ designates the wheel brake pressure for the low wheel, $V_{Kfz}$ designates the vehicle speed, and dotted line $R_S$ designates a threshold value for the beginning of regulation. At time point $t_1$, low wheel 11 has a wheel speed $v_{Low}$, which corresponds to threshold value $R_S$ for the beginning of regulation, i.e., with respect to low wheel 11, a tendency to spin is detected. At time point $t_1$, therefore, a first wheel brake pressure $p_{Low}$ is built up by a first filling pulse F1, to counteract the tendency to spin of low wheel 11. The duration of the first so-called slip bulge is designated as T1 and amounts to roughly 1.5 seconds, which represents a typical value. As can be seen from the upper graph of FIG. 3, wheel speed $v_{Low}$ of low wheel 11 is reduced after roughly 2 seconds by first wheel brake pressure $p_{Low}$ until it lies roughly within the range of threshold $R_S$ for the beginning of regulation.

In the lower graph of FIG. 3, $v_{High}$ designates the wheel speed of high wheel 12, for which a higher coefficient of friction $\mu_H$ exists, $p_{High}$ designates the second wheel brake pressure provided according to the present invention, and $V_{Kfz}$ also designates the vehicle speed. The curve of wheel speed $V_{High}'$, depicted by a dotted line, represents a potential instability of high wheel 12. At time point $t_1$, i.e., simultaneous with first filling pulse F1, a second wheel brake pressure is built up for high wheel 12 by a second filling pulse F2. The length of second filling pulse F2 amounts to roughly 75% of the length of first filling pulse F1. A force component $F_{BH}$ is generated by second wheel brake pressure $p_{High}$, built up by second filling pulse F2, the force component in the manner depicted in FIG. 2 contributing to a reduction of disturbing torque $M_S$, so that altogether only a reduced disturbing torque $M_S'$ results. During time segment T2, second wheel brake pressure $p_{High}$ results in preventing the vehicle from rolling backwards. After time segment T2, second wheel brake pressure $p_{High}$ is slowly reduced by leakage pulses in the manner depicted. If during a time segment T3 instability should arise with respect to the wheel speed of high wheel 12, as is depicted by the dotted-line curve of $v_{High}'$, then proceeding on the basis of the residual wheel brake pressure $p_{High}$ still remaining at the beginning of time segment T3, the regulation pressure can be rapidly built up. Approximately beginning at time point $t_2$, no appreciable second wheel brake pressure $p_{High}$ remains, i.e., the vehicle is not fixedly braked.

Figure 4:
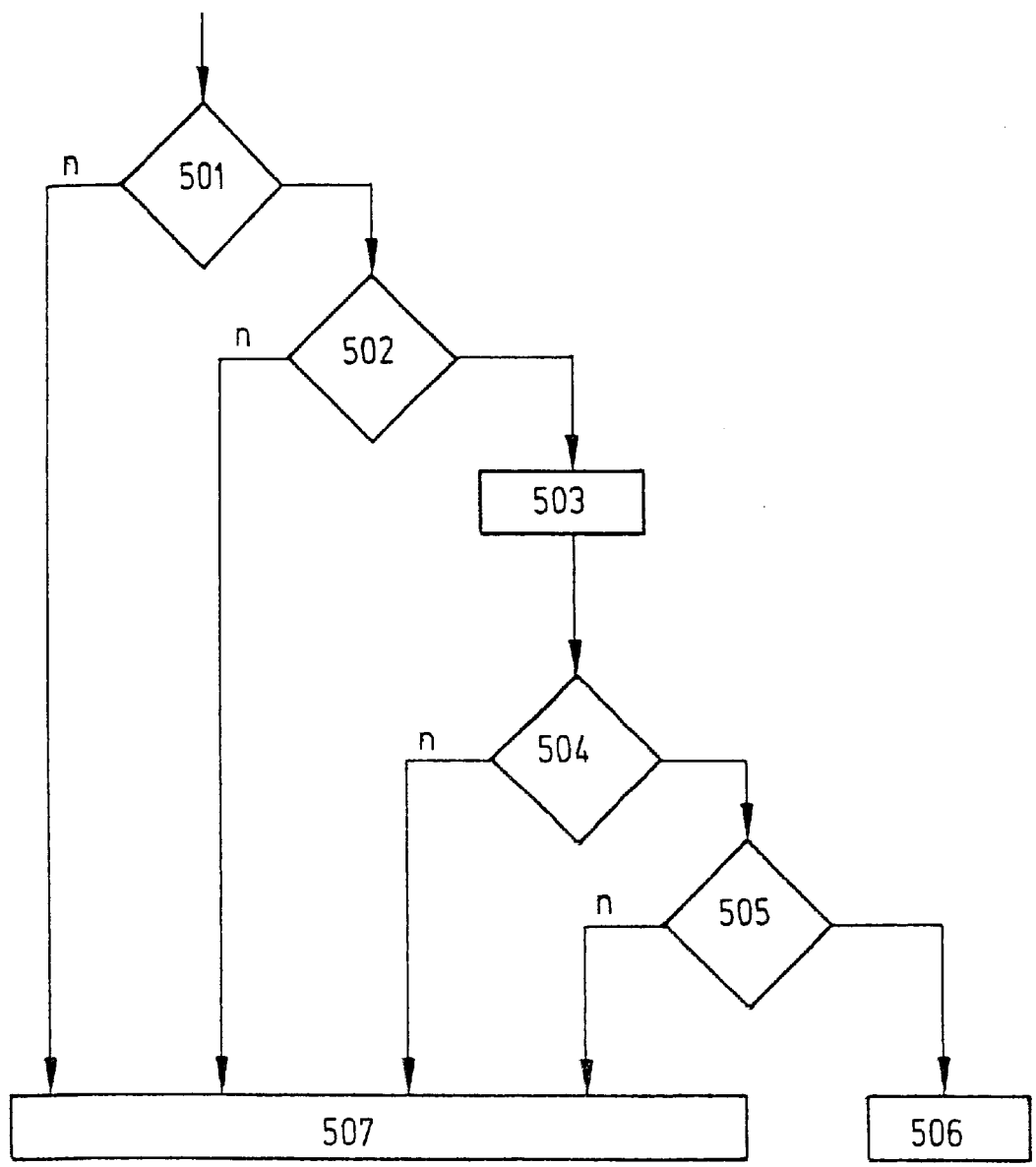
FIG. 4 depicts a flowchart that illustrates one embodiment of the method according to the present invention.

FIG. 4 depicts a flowchart, which illustrates an embodiment of the method according to the present invention. In block 501, a check test is carried out as to whether the wheel in question has a tendency to spin, i.e., a check test is carried out as to whether a parameter RA_Low has a value which is greater than 0. If this is not the case, then a branching occurs to a block 507, in which no regulation is undertaken. Otherwise, in block 502, a check test is carried out as to whether a counter reading FPZ1 of a counter for the duration of the first filling pulse at low wheel 11 is smaller than a preestablished parameter value #FPZ_LOW, which indicates first filling pulse duration F1. If this is not the case, then a branching occurs to block 507, where no regulation takes place. Otherwise, in block 503 for low wheel 11, first filling pulse F1 is generated, i.e., low wheel 11 is regulated. Subsequently, in block 504, a check test is carried out as to whether the vehicle speed indicated by parameter FZ_Ref is smaller than a preestablished speed threshold #V_START1 for the start-up range. If this is not the case, then a branching occurs to block 507, where no regulation takes place. Otherwise, in block 505, a test is carried out as to whether a counter reading FPZ2 is smaller than a preestablished duration of second filling pulse F2, this duration of second filling pulse F2 potentially being 60 ms. If this is not the case, then a branching occurs to block 507, i.e., at high wheel 12, a second braking pressure is not built up. Otherwise, at block 506, a corresponding second wheel brake pressure is built up by a second filling pulse F2.

A second embodiment of the method according to the present invention, with respect to blocks 501, 502, 503, and 507, corresponds to the embodiment just described. However, in the second embodiment in block 504, a check test is carried out as to whether the difference between the momentary vehicle speed, which exists in the form of a parameter value FZ_Ref2, and the vehicle speed at the beginning of regulation, which exists as a result of a parameter value FZ_Ref2, is smaller than a parameter value #V_START2, which indicates the speed increase in the regulation. If this is not the case, then a branching occurs to block 507, i.e., a second wheel brake pressure is not built up. Otherwise, in block 505, a check test is carried out as to whether a counter reading FPZ2, which indicates the duration of second filling pulse F2 for high wheel 12, is smaller than a parameter value #FPZ_HIGH, which indicates the duration of second filling pulse F2, which can amount to, for example, 16 ms. If this is the case, then a branching occurs to block 507, i.e., a second wheel brake pressure is not built up. Otherwise, in block 506, a second wheel brake pressure is built up by a second filling pulse F2.

What is claimed is:

1. A traction control device for a vehicle that includes at least one axle to which are assigned two driven wheels, the traction control device comprising:

an arrangement for, when an incipient slippage arises in one of the two driven wheels of the at least one axle, regulating a kinematic behavior of the one of the two driven wheels by building up a first wheel brake pressure such that the one of the two driven wheels remains within a permissible slip range; and an arrangement for, in order to reduce a disturbance torque caused by the first wheel brake pressure, for another one of the two driven wheels, building up a second wheel brake pressure;

wherein the second wheel brake pressure is adjustable independently of the first wheel brake pressure;

wherein a first filling pulse contributes to building up the first wheel brake pressure;

wherein a second filling pulse contributes to building up the second wheel brake pressure; and wherein a length of the second filling pulse is selected such that, when there is a road incline, a rollback motion of the vehicle is one of reduced and prevented.

2. A traction control device for a vehicle that includes at least one axle to which are assigned two driven wheels, the traction control device comprising:

an arrangement for, when an incipient slippage arises in one of the two driven wheels of the at least one axle, regulating a kinematic behavior of the one of the two driven wheels by building up a first wheel brake pressure such that the one of the two driven wheels remains within a permissible slip range; and an arrangement for, in order to reduce a disturbance torque caused by the first wheel brake pressure, for another one of the two driven wheels, building up a second wheel brake pressure;

wherein the second wheel brake pressure is adjustable independently of the first wheel brake pressure; and wherein the second wheel brake pressure is slowly reduced until the vehicle moves forward.

3. A traction control device for a vehicle that includes at least one axle to which are assigned two driven wheels, the traction control device comprising:

an arrangement for, when an incipient slippage arises in one of the two driven wheels of the at least one axle, regulating a kinematic behavior of the one of the two driven wheels by building up a first wheel brake pressure such that the one of the two driven wheels remains within a permissible slip range; and an arrangement for, in order to reduce a disturbance torque caused by the first wheel brake pressure, for another one of the two driven wheels, building up a second wheel brake pressure;

wherein the second wheel brake pressure is adjustable independently of the first wheel brake pressure;

wherein a first filling pulse contributes to building up the first wheel brake pressure;

wherein a second filling pulse contributes to building up the second wheel brake pressure; and wherein the first filling pulse has a length such that, at a time point of an end of the first filling pulse, the first wheel brake pressure lies within the range of 7.5 to 12.5 bar, if the at least one axle is a front axle; and the first filling pulse has a length such that, at the time point of the end of the first filling pulse, the first wheel brake pressure lies within the range of 15 to 20 bar, if the at least one axle is a rear axle.

4. A traction control device for a vehicle that includes at least one axle to which are assigned two driven wheels, the traction control device comprising:

an arrangement for, when an incipient slippage arises in one of the two driven wheels of the at least one axle, regulating a kinematic behavior of the one of the two driven wheels by building up a first wheel brake pressure such that the one of the two driven wheels remains within a permissible slip range; and an arrangement for, in order to reduce a disturbance torque caused by the first wheel brake pressure, for another one of the two driven wheels, building up a second wheel brake pressure;

wherein the second wheel brake pressure is adjustable independently of the first wheel brake pressure;

wherein a first filling pulse contributes to building up the first wheel brake pressure;

wherein a second filling pulse contributes to building up the second wheel brake pressure; and wherein the second filling pulse has a length such that the second wheel brake pressure amounts to roughly 50% to 75% of the first wheel brake pressure at a time point of an end of the first filling pulse.

5. A method for controlling a slip of at least one driven wheel of an axle of a vehicle, comprising the steps of:

detecting a tendency to slip in one of the at least one driven wheel of the axle, the detected wheel corresponding to an axle wheel tending to slip;

controlling a kinematic behavior of the axle wheel tending to slip by building up a first wheel brake pressure such that the axle wheel tending to slip remains within a permissible slip range; and building up a second wheel brake pressure that is adjustable independently of the first wheel brake pressure for an axle wheel that is not tending to slip, in order to reduce a disturbance torque that is caused by the first wheel brake pressure;

wherein a first filling pulse contributes to building up the first wheel brake pressure;

wherein a second filling pulse contributes to building up the second wheel brake pressure; and wherein a length of the second filling pulse is selected such that, when there is a road incline, a rollback motion of the vehicle is one of reduced and prevented.

6. A method for controlling a slip of at least one driven wheel of an axle of a vehicle, comprising the steps of:

detecting a tendency to slip in one of the at least one driven wheel of the axle, the detected wheel corresponding to an axle wheel tending to slip;

controlling a kinematic behavior of the axle wheel tending to slip by building up a first wheel brake pressure such that the axle wheel tending to slip remains within a permissible slip range; and building up a second wheel brake pressure that is adjustable independently of the first wheel brake pressure for an axle wheel that is not tending to slip, in order to reduce a disturbance torque that is caused by the first wheel brake pressure; and slowly reducing the second wheel brake pressure until the vehicle is moving forward.

7. A method for controlling a slip of at least one driven wheel of an axle of a vehicle, comprising the steps of:

detecting a tendency to slip in one of the at least one driven wheel of the axle, the detected wheel corresponding to an axle wheel tending to slip;

controlling a kinematic behavior of the axle wheel tending to slip by building up a first wheel brake pressure such that the axle wheel tending to slip remains within a permissible slip range; and building up a second wheel brake pressure that is adjustable independently of the first wheel brake pressure for an axle wheel that is not tending to slip, in order to reduce a disturbance torque that is caused by the first wheel brake pressure;

wherein a first filling pulse contributes to building up the first wheel brake pressure;

wherein a second filling pulse contributes to building up the second wheel brake pressure;

wherein the first filling pulse has a length such that, at a time point of an end of the first filling pulse, the first wheel brake pressure lies within the range of 7.5 to 12.5 bar, if the axle is a front axle; and wherein the first filling pulse has a length such that, at the time point of the end of the first filling pulse, the first wheel brake pressure lies within the range of 15 to 20 bar, if the axle is a rear axle.

8. A method for controlling a slip of at least one driven wheel of an axle of a vehicle, comprising the steps of:

detecting a tendency to slip in one of the at least one driven wheel of the axle, the detected wheel corresponding to an axle wheel tending to slip;

controlling a kinematic behavior of the axle wheel tending to slip by building up a first wheel brake pressure such that the axle wheel tending to slip remains within a permissible slip range; and building up a second wheel brake pressure that is adjustable independently of the first wheel brake pressure for an axle wheel that is not tending to slip, in order to reduce a disturbance torque that is caused by the first wheel brake pressure;

wherein a first filling pulse contributes to building up the first wheel brake pressure;

wherein a second filling pulse contributes to building up the second wheel brake pressure; and wherein the second filling pulse has a length such that the second wheel brake pressure amounts to roughly 50% to 75% of the first wheel brake pressure at a time point of an end of the first filling pulse.

* * * * *